United States Patent [19]

Byer et al.

[11] Patent Number: 4,902,127

[45] Date of Patent: Feb. 20, 1990

[54] EYE-SAFE COHERENT LASER RADAR

[75] Inventors: Robert L. Byer, Stanford; Thomas J. Kane, Palo Alto, both of Calif.

[73] Assignee: Board of Trustees of Leland Stanford, Jr. University, Stanford, Calif.

[21] Appl. No.: 171,562

[22] Filed: Mar. 22, 1988

[51] Int. Cl.[4] ............................ G01C 3/08; G01P 3/36
[52] U.S. Cl. ..................................... 356/5; 356/28.5; 330/4.3
[58] Field of Search .................... 330/4.3; 356/5, 28.5, 356/4.5

[56] References Cited

U.S. PATENT DOCUMENTS

| Re. 30,898 | 4/1982 | Cantrell et al. | 330/4.3 X |
|---|---|---|---|
| 3,740,664 | 6/1973 | Freiburg et al. | 372/94 X |
| 4,264,870 | 4/1981 | Avicola et al. | 330/4.3 |
| 4,344,042 | 8/1982 | Hon | 330/4.3 |
| 4,413,905 | 11/1983 | Holzapfel | 356/5 |
| 4,493,528 | 1/1985 | Shaw et al. | 350/96.15 |
| 4,536,058 | 8/1985 | Shaw et al. | 350/96.15 X |
| 4,552,456 | 11/1985 | Endo | 356/5 |
| 4,578,793 | 3/1986 | Kane et al. | 372/94 |
| 4,655,588 | 4/1987 | Chenausky et al. | 356/5 |
| 4,701,928 | 10/1987 | Fan et al. | 372/70 X |
| 4,743,110 | 5/1988 | Arnaud et al. | 356/5 |
| 4,760,577 | 7/1988 | Aoshima | 372/94 X |

Primary Examiner—Thomas H. Tarcza
Assistant Examiner—Linda J. Wallace
Attorney, Agent, or Firm—Flehr, Hohbach, Test, Albritton & Herbert

[57] ABSTRACT

In an eye-safe coherent laser radar, a laser diode optically pumps a solid state non-planar ring laser to produce the coherent output laser radiation. The laser radiation is passed through a Faraday isolator to an optically pumped slab three-stage linear amplifier imparting 56 db gain. A telescope transmits the amplified laser radiation to illuminate a target. Optical radiation returned from the target is collected by the telescope and focused into a single transverse mode fiber-optic waveguide for combination in the fiber with reference lasant radiation by means of a single mode fiber coupler. The combined optical radiation is then detected by a photodetector to produce a difference frequency output representative of parameters of the target.

27 Claims, 1 Drawing Sheet

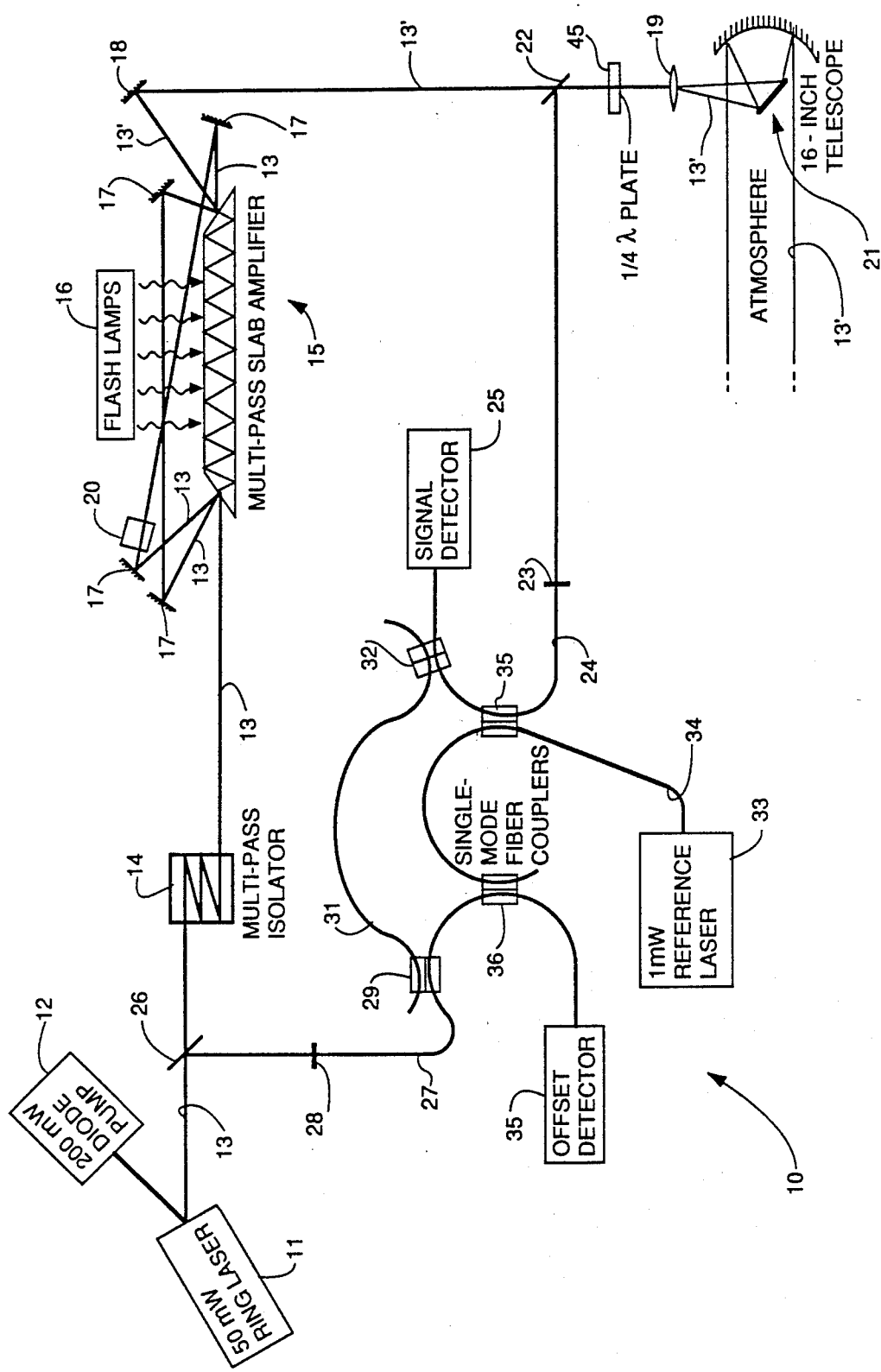

EYE-SAFE COHERENT LASER RADAR

GOVERNMENT CONTRACT

The present invention was made in performance of a contract with the U.S. Government and the Government has certain rights therein.

BACKGROUND OF THE INVENTION

The present invention relates in general to coherent laser radar and, more particularly, to such a radar of a wavelength in excess of 1.4 μm so as to be in the eye-safe range.

DESCRIPTION OF THE PRIOR ART

Heretofore, pulse Doppler coherent laser radar systems have been proposed. Such systems require a single-frequency, frequency-stable cw or quasi-cw source of optical radiation and some means of amplifying the output of the source to the level required for a detectable return signal. A flash-lamp-pumped-ruby-laser transmitter reported in 1966 came close to meeting these requirements, but no report of actual operation was made. Such a ruby-laser system is disclosed in an article appearing in IEEE Journal of Quantum Electronics, QE-2, at pg. 519 (1966).

Since 1967 all reported coherent laser radar systems have made use of $CO_2$ lasers operating near 10 μm. The versatility of $CO_2$ laser technology makes possible both stable cw operation and high-gain pulsed amplification. Despite the success of $CO_2$-based laser radar systems, solid state laser radar systems are more interesting for two reasons. First, for some applications, the small size and long operational lifetimes provided by laser-diode pumped solid state lasers would be of great value. Secondly, the shorter wavelength of $Nd^{3+}$ laser is preferable for some applications, especially those for which atmospheric turbulence is not a problem.

The theoretical capability of a 1.06μm laser radar wind-measurement system has been compared with that of a 10.6 μm system. The measurement capabilities of systems with comparable transmitter power levels have been found to be similar. A major drawback of the 1.06 μm wavelength is lack of eye safety. The capabilities are compared in articles appearing in Applied Optics, Vol. 23 at pg. 2477 (1984) and Vol. 25, pg. 2546 (1986).

SUMMARY OF THE PRESENT INVENTION

The principal object of the present invention is the provision of an improved coherent laser radar.

In one feature of the present invention, the laser radiation is derived from a semiconductive diode pumped solid state laser gain medium, whereby the efficiency and reliability of the source of laser radiation is improved.

In another feature of the present invention, the laser source for the coherent laser radiation includes a laser diode pumped ring laser, whereby the frequency stability of the source of laser radiation is improved.

In another feature of the present invention, source of laser radiation is amplified in a multi-pass slab amplifier or solid state oscillator seeded with the laser radiation derived from the diode pumped source, whereby stable linear amplification of the source radiation is obtained.

In another feature of the present invention, the returned radiation is received and coupled into a single mode fiber optic waveguide wherein it is combined there with reference optical radiation derived from a coherent source and the combined optical wave energy is then mixed and detected in a detector to derive a difference signed representative of the parameters associated with the target.

In another feature of the present invention, the coherent laser radiation is of an eye-safe wavelength greater than 1.5 micrometers, whereby the safety of the radar system is substantially improved, especially for longer range applications.

In another feature of the present invention, the coherent laser radiation, to be transmitted to the target, is derived from a semiconductive diode pumped laser gain medium doped with a lasing ion and an absorbing ion. The absorbing ion absorbs the pumping radiation and transfers the absorbed energy to the lasing ion for inverting the population of the desired energy transition levels to produce an eye-safe output beam with wavelengths greater than 1.4 micrometers.

In another feature of the present invention, the source of coherent eye-safe radiation includes a solid state host material doped with a lasant ion selected from the group consisting of Tm, Er, Nd, Ho, Dy, Yb and U and co-doped with an absorber ion selected from the group consisting of Tm, Er, Nd, and U.

In another feature of the present invention, the eye-safe lasant radiation is derived from a source including a host material selected from the group consisting of transparent oxide crystals, transparent fluoride crystals, transparent garnets, yttrium aluminum garnet, $YAlO_3$ and $LiYF_4$.

Other features and advantages of the present invention will become apparent upon a perusal of the following specification taken in connection with the accompanying drawing.

BRIEF DESCRIPTION OF THE DRAWING

The drawing is a schematic line diagram, partly in block diagram form, of an eye-safe coherent laser radar incorporating features of the present invention.

DESCRIPTION OF THE PREFERRED EMBODIMENTS

Referring now to the drawing, there is shown a coherent laser radar system 10 incorporating features of the present invention. A ring laser oscillator 11 such as that described in U.S. Pat. No. 4,578,793 issued 25 March 1986, is optically pumped by means of a semiconductive diode laser pump 12 to produce an output beam 13 of coherent laser radiation, preferably in the eye-safe region of a wavelength greater than 1.5 micrometers. The output beam is directed through a multi-pass Faraday isolator 14 for isolating the ring laser oscillator 11 from back reflection of the output radiation once it is passed through the isolator 14. A Faraday isolator is disclosed in an article titled: "Optical Isolator for Near Infrared" appearing in the review of Scientific Instruments, Vol. 38, pg. 248 of February 1967.

The output of the Faraday isolator 14 as beam 13 is fed into a multi-pass slab amplifier 15. The slab amplifier 15 includes a slab of laser gain medium such as Nd:YAG optically pumped through one or more of its broad faces by means of flashlamps 16. A plurality of mirrors 17 are positioned relative to the slab to cause the amplified beam 13 to pass through the slab amplifier a number of times, such as 3 times, along three different paths within the slab so as to provide a three-stage amplifier. The output beam of the amplifier 13' is reflected from a mirror 18 to an eyepiece 19 of a 16" telescope 21 which directs the output beam 13' toward the targets to be illuminated.

An acoustic optical modulator 20 is placed in one return path around the multi-pass slab amplifier 15 for pulse modulating the output beam 13' of the amplifier 15. A linear polarizing beamsplitter 22 aligned with the linear polarization of the output beam 13' passes the output beam to a quarter wave plate 45 which converts the linear polarized beam to circular polarization of one handedness Optical radiation returned from the target is circularly polarized with opposite handedness and is received by the telescope 21 and focused by the eyepiece 19 back upon the beamsplitting mirror 22 through the $\frac{1}{4}\lambda$ plate 45 to change the circular polarization to linear polarization 90° to the original linear polarization. The mirror 22 reflects the returned signal and directs it to a fiber-optic coupler 23 which couples the returned laser radiation into a single transverse mode fiber-optic waveguide 24, such as an index guided glass fiber.

Fiber-optic waveguide 24 is connected to an optically non-linear signal detector such as a photodiode 25 wherein the returned signal is heterodyned against a coherent reference source of optical radiation to produce a difference frequency signal.

In one embodiment, the reference laser radiation is derived by sampling the output beam 13 of the ring laser 11 with a beamsplitting mirror 26. The sample radiation is coupled into a single transverse mode fiber-optic waveguide 27 via coupler 28. A directional coupler 29 of the type disclosed in U.S. Pat. Nos. 4,536,058 and 4,493,528, the disclosures of which are hereby incorporated by reference, is coupled to the fiber-optic waveguide 27 for coupling a portion of the coherent laser radiation into a second fiber-optic single axial mode fiber-optic waveguide 31 which combines the reference laser radiation with the returned radiation in a directional coupler 32 coupled to return fiber-optic waveguide 24. The combined reference and return laser radiation signals are then heterodyned in the photo detector 25 to produce the difference signal output.

In an alternative embodiment, a second stable source of laser radiation such as a lower powered semiconductive diode ring laser at 33 has its lasant radiation coupled into a single transverse mode fiber-optic waveguide 34. The fiber-optic waveguide 34 is connected to a directional coupler 35, of the type previously described, which serves to combine the reference signal derived from source 33 with the returned laser radiation in waveguide 24 for detection in the photodetector 25 to produce the difference frequency signal. This latter embodiment is particularly useful in connection with moving platforms such as satellites wherein it is desired to tune the second source of radiation 33 to a wavelength so as to offset the Doppler shift due to relative movement of the platform relative to the target.

The reference radiation derived from source 33 and propagating in waveguide 34, is thence coupled into an offset detector 35 via a second fiber-optic directional coupler 36. The directional coupler 36 combines the reference radiation from source 33 with the radiation derived from the main oscillator 11 in optical waveguide 27 which is thence coupled into the offset photodetector 35. Knowing the velocity of the platform, the reference source 33 may be tuned to a wavelength so as to produce a difference frequency corresponding to the Doppler shift due to the velocity of the platform.

In a preferred embodiment, the solid state gain medium of the ring laser 11 includes a host material co-doped with an absorber ion and a lasing ion as taught in U.S. Pat. No. 4,701,928 issued Oct. 20, 1987, the disclosure of which is hereby incorporated by reference in its entirety, to produce output radiation in the eye-safe range with a wavelength greater than 1.5 micrometers. In such a co-doped gain medium, the following doping combinations are useful: Er and Ho; Er and Tm; Tm and Ho; Er and Dy; Tm and Dy; Nd and Yb; Er and U; and U and Dy where the absorber ion is listed first and the lasing ion is listed second. Er and Nd are also suitable lasant ions. This list is not meant to be exhaustive, however, it does give absorber laser ion combinations that illustrate absorption at diode laser wavelengths and have quasi-four-level laser transitions. In addition to YAG crystal host material, other appropriate host crystals may be employed for these ion combinations including transparent oxide crystals, transparent fluoride crystals, transparent garnets, yttrium aluminum garnet, $YAlO_3$ and $LiYF_4$.

The laser gain material of the amplifier 15 is preferably co-doped in the same manner as that of the laser gain material of the ring laser 11 but, in addition, can include an additional dopant such as chromium to assist in absorbing the optical pumping radiation derived from the flashlamps 16. As an alternative, the slab laser amplifier 15 is optically pumped by an array of diode lasers.

As an alternative to the multi-pass slab laser amplifier 15, an seeded optically pumped oscillator may be employed. In a typical example, the multi-pass slab amplifier provides 56 db of gain.

One particularly advantageous use of the coherent laser radar system 10 of the present invention, is for use in orbiting satellites for global remote measurements. The laser-diode pumping offers high efficiency approaching 15% overall and long lifetimes, approaching 20,000 hrs. The solid state laser gain medium takes advantage of the very high efficiency of the laserdiode source 12 now at 35% to 40%, and adds the ability to collect and store the energy such that it can be extracted in a defraction limited spatial mode, and potentially with shot-noise limited spectral behavior. Furthermore, the solid state laser gain medium allows energy storage and amplification of the radiation in the large volumes required for transmitted average power levels of 100 W as required for global measurements.

Transmission of pulsed laser radiation at this power level (100 W) from an orbiting satellite necessitates operation at an eye-safe wavelength, i.e., a wavelength in excess of 1.5 micrometers. For example, a 1 $\mu$m, 10-J laser pulse transmitted at the diffraction limit from a 30-cm diameter aperture at a distance of 100 km would produce maximum energy fluences of approximately 100 $\mu J/cm^2$. This value will be required by atmospheric scattering and absorption, but it could still be above the threshold for eye damage. If 10 $\mu J$ of optical energy were transmitted through the lens of the eye and focused to a 10-$\mu$m spot size, a peak exposure of 10 $\mu J$ $cm^2$ would result in the retina. An exposure to a 2-$\mu$m pulse, however, even at a fluence of 100 $\mu J/cm^2$ would not damage the cornea, where it would be absorbed. The 1-$\mu$m wavelength will be useful for shorter range measurements that require substantially less transmitted energy.

The signal-to-noise ratio of a heterodyne detector, such as photodetector 25, is greatest when: (1) only a single spatial mode of the radiation field is detected; (2) the particular mode chosen for detection is that with the greatest power, and (3) the signal and local oscillator modes are perfectly overlapped. Detection of weaker modes and misalignment both result in signal reduction. Any size mismatch increases the noise. A single-mode fiber 24 is an ideal means for insuring the detection of no more than a single mode. In addition, the use of a fiber input 23 at the telescope provides an easy way to align for the strongest signal, since the fiber's end is easily translated in the telescope's focal plane. Single-mode fiber couplers 29, 32, 35 and 36 perform analogously to a beamsplitter in a conventional interferometer, except that misalignment is impossible and the splitting ratio can be made to vary continuously over all possible values. The mixing of the telescope signal with the local oscillator can be done with high efficiency and perfect overlap by means of commercially available single-mode fiber couplers.

In a typical example, the transmitted beam 13' is pulsed to provide 3-kW peak power and 5-microseconds duration with the beam focused straight up onto a layer of clouds about 2000 meters away. A strong signal was detected using the fiber-based heterodyne detection system of the drawing. The diode pumped ring oscillator 11 served the dual role of master oscillator for transmission and local oscillator for detection in detector 25. When employing a laser gain medium of Tm:Ho:YAG, pumping radiation of 782 nm derived from a diode laser 12, the ring laser 11 operate single-mode tunable over the range of 1.9 to 2.1 $\mu$m, a portion of the spectrum rich in water and carbon dioxide absorption lines.

What is claimed is:

1. In a method for coherently detecting returned eye-safe laser radiation, the steps of:
    optically pumping a solid state laser gain medium with optical pumping radiation emanating from a semiconductive diode;
    resonating lasant radiation emanating from the optically pumped laser gain medium to produce coherent output lasant radiation of an eye-safe wavelength in excess of 1.5 $\mu$m;
    amplifying the coherent output lasant radiation in an optical amplifier to produce amplified coherent eye-safe output lasant radiation;
    transmitting the amplified output eye-safe lasant radiation from a transmitter station;
    receiving at a receiving station the lasant radiation returned from a target intercepted by the transmitted lasant radiation;
    collecting the received eye-safe lasant radiation and propagating the same over a single mode fiber-optic waveguide; and
    mixing the received lasant radiation as propagated over the single mode fiber-optic waveguide with reference coherent lasant radiation to derive a difference frequency output signal representative of parameters associated with the target.

2. The method of claim 1 wherein the step of resonating the eye-safe lasant radiation includes the step of:
    internally reflecting the lasant radiation from a plurality of facets of the solid state laser gain medium and around in a closed path to define a ring resonator.

3. The method of claim 1 wherein the step of amplifying the lasant radiation includes the step of:
    directing the lasant radiation to be amplified into a slab of optically pumped laser gain material and amplifying the lasant radiation within the slab of optically pumped laser gain material.

4. The method of claim 3 including the step of:
    passing the lasant radiation being amplified through the slab of optically pumped lasant material a plurality of times and over a plurality of different optical paths.

5. The method of claim 1 wherein the step of amplifying the lasant radiation includes the step of:
    directing the lasant radiation to be amplified into an optically pumped laser gain medium contained within an optical resonator for seeding and initiating amplified lasant transitions of the gain medium at the wavelength of the lasant radiation being amplified.

6. The method of claim 1 wherein the step of mixing the received lasant radiation with reference coherent lasant radiation includes the steps of:
    optically coupling a second fiber-optic waveguide containing the reference radiation together with the first fiber-optic waveguide containing the received radiation such that both radiations are combined and propagated together in a common fiber-optic waveguide; and
    applying both radiations as propagated over said common fiber optic waveguide to a photodetector for detecting the difference frequency output.

7. The method of claim 1 including the step of:
    sampling the coherent output lasant radiation to produce the reference lasant radiation for mixing with the received lasant radiation.

8. The method of claim 1 including the step of:
    optically pumping a second solid state member of lasant material with optical pumping radiation derived from a semiconductive diode to excite reference lasant transitions to produce the reference lasant radiation for mixing with the received lasant radiation.

9. The method of claim 1 wherein the laser gain medium includes a host material doped with a lasant ion selected from the group consisting of Er, Nd, Tm, Ho, Dy, Yb and U.

10. The method of claim 9 wherein the host material is co-doped with an absorber ion selected from the group consisting of Tm, Er, Nd and U.

11. The method of claim 9 wherein the host material is selected from the group consisting of transparent oxide crystals, transparent fluoride crystals, transparent garnets, yttrium aluminum garnet, YAlO$_3$ and LiYF$_4$.

12. The method of claim 1 wherein the laser gain medium is Ho:Tm:YAG lasing at a wavelength in excess of 1.5 $\mu$m.

13. The method of claim 1 including the step of:
    passing the lasant radiation emanating from the laser gain medium through an optical isolator and thence to the optical amplifier to reduce optical feedback from the optical amplifier to the diode pumped laser gain medium.

14. In an eye-safe coherent laser radar:
    a solid state laser gain medium;
    optical pumping means for optically pumping said laser gain medium with optical pumping radiation emanating from a semiconductive diode;
    optical resonator means optically coupled to said laser gain medium for resonating lasant radiation emanating from said optically pumped laser gain medium to produce coherent output laser radiation of an eye-safe wavelength in excess of 1.5 μm;

optical amplifier means optically coupled to said laser gain medium for amplifying the coherent eye-safe output lasant radiation;

transmitter station means optically coupled to said optical amplifier means for transmitting the amplified output eye-safe lasant radiation over a path to illuminate a target;

receiver means for receiving the output lasant radiation returned from the illuminated target;

a single transverse mode fiber-optic waveguide optically coupled to said receiver means and disposed to receive and propagate therein as a single transverse mode returned and received output lasant radiation;

combining means for combining the returned and received output lasant radiation as propagated over said single mode fiber-optic waveguide with reference coherent lasant optical radiation; and detecting means optically coupled to the combined optical radiation for detecting a difference frequency output signal therebetween representative of parameters associated with the illuminated target.

15. The laser radar of claim 14 wherein said optical resonator means includes a plurality of optically reflective facets of said solid state laser gain medium for internally reflecting the lasant radiation therefrom around a closed path to define a ring optical resonator.

16. The laser radar of claim 14 wherein said optical amplifier means includes a slab of solid state laser gain material having a pair of mutually opposed broad side walls between which the lasant radiation to be amplified is reflected back-and-forth in a zig-zag path; and optical pumping means for directing optical pumping radiation through at least one of said broad side walls into said slab of laser gain medium for optically pumping same.

17. The laser radar of claim 16 including means for directing the lasant radiation through said slab of optically pumped laser gain medium a plurality of times and over a plurality of side-by-side separate zig-zag optical paths for providing a plurality of stages of optical amplification, one stage for each of the separate optical paths.

18. The laser radar of claim 14 wherein said optical amplifier means includes an amplifying member of solid state laser gain material;

optical pumping means for directing optical pumping radiation into said amplifying member of solid state laser gain material for optically pumping same;

amplifying optical resonator means optically coupled to said amplifier gain member for resonating optical lasant radiation emanating from lasant energy transitions within said amplifier gain member and for coupling the resonated radiation into said amplifier laser gain member; and seeding means for coupling the output lasant radiation to be amplified into said optically pumped amplifier laser gain member for initiating amplification of said output lasant radiation.

19. The laser radar of claim 14 wherein said combining means includes a fiber-optic directional coupler for optically coupling the reference laser optical radiation into said single mode fiber-optic waveguide containing said returned output laser radiation such that both said reference and returned lasant radiation are propagated together in a common fiber-optic waveguide.

20. The laser radar of claim 14 including means for sampling the coherent output lasant radiation to derive the reference lasant radiation for being combined with the received lasant radiation.

21. The laser radar of claim 14 wherein said solid state laser gain medium includes a lasant ion selected from the group consisting of Er, Nd, Tm, Ho, Dy, Yb and U.

22. The laser radar of claim 14 wherein said laser gain medium includes an absorber ion selected from the group consisting of Tm, Er, Nd and U.

23. The laser radar of claim 14 wherein said solid state laser gain medium includes a host material selected from the group consisting of transparent oxide crystals, transparent fluoride crystals, transparent garnets, yttrium aluminum garnet, $YAlO_3$ and $LiYF_4$.

24. The laser radar of claim 14 including:

optical isolator means disposed to receive and pass the output lasant radiation emanating from said optically pumped laser gain medium onto said optical amplifier means and for attenuating output lasant radiation emanating from said optical amplifier means and travelling back toward said solid state laser gain medium.

25. The laser of claim 14 including a reference source of laser radiation.

26. The laser radar of claim 25 wherein said reference source of laser radiation is a semiconductive diode ring laser.

27. In a coherent laser radar:

a solid state laser gain medium;

optical pumping means for optically pumping said laser gain medium with optical pumping radiation emanating from a semiconductive diode;

optical resonator means optically coupled to said laser gain medium for resonating lasant radiation emanating from said optically pumped laser gain medium to produce coherent output lasant radiation;

optical amplifier means optically coupled to said laser gain medium for amplifying the coherent output lasant radiation;

transmitter station means optically coupled to said optical amplifier means for transmitting the amplified output lasant radiation over a path to illuminate a target;

receiver means for receiving the output lasant radiation return from the illuminated target;

a single transverse mode fiber-optic waveguide optically coupled to said receiver means and disposed to receive and propagate therein as a single transverse mode the returned and received output lasant radiation;

combining means for combining the returned and received output lasant radiation as propagated over said single mode fiber-optic waveguide with reference coherent lasant radiation; and detecting means optically coupled to the combined optical radiation for detecting a difference frequency output signal therebetween representative of parameters associated with the target.

* * * * *